United States Patent Office 3,436,319
Patented Apr. 1, 1969

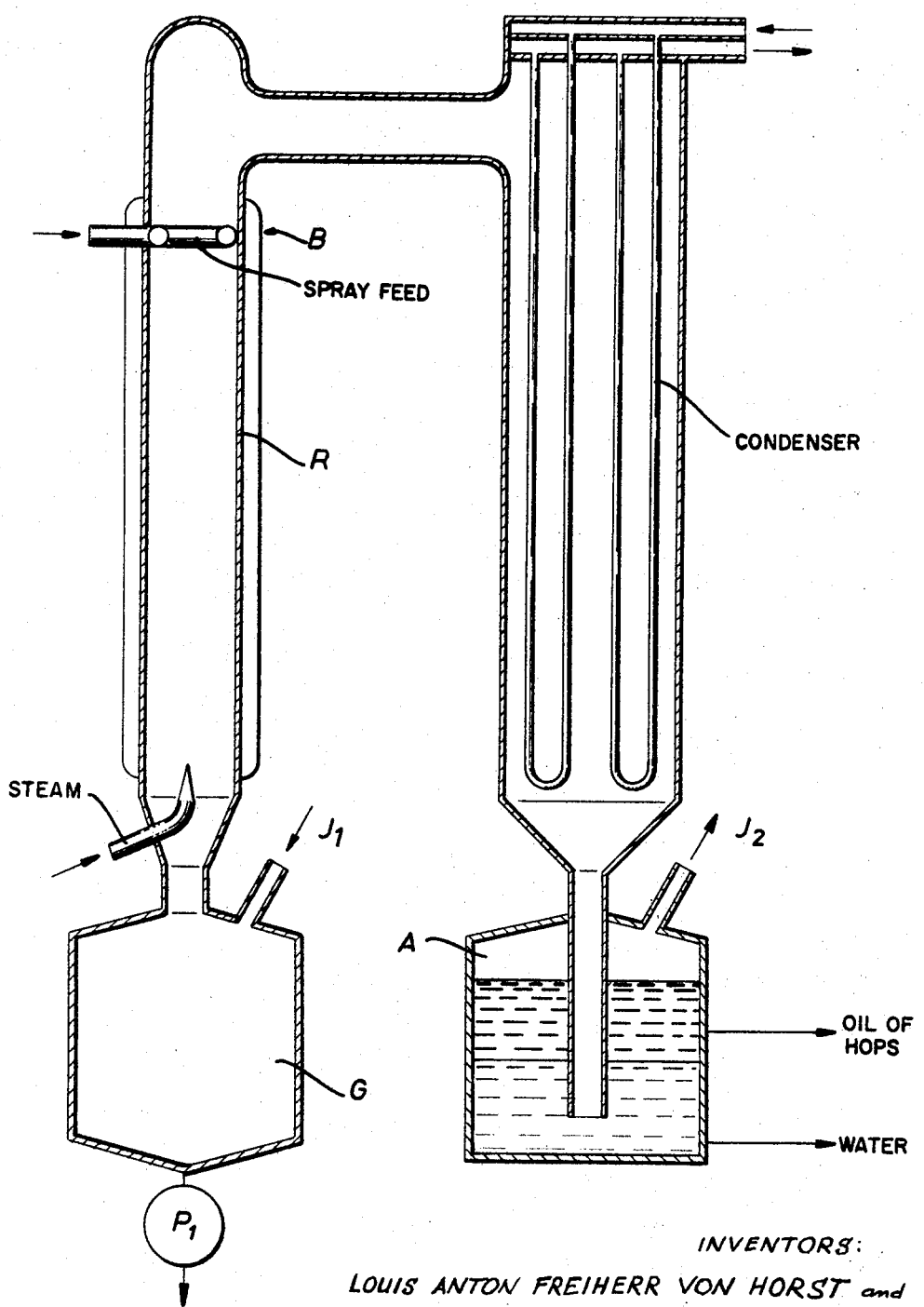

3,436,319
THIN LAYER STEAM DISTILLATION OF HOP OIL EXTRACT
Louis Anton Freiherr von Horst and Maximilian Kellner, Coburg, Germany, assignors to Irmgard F. von Horst, Coburg, Germany
Filed Apr. 27, 1965, Ser. No. 451,169
Claims priority, application Germany, Aug. 8, 1964, H 53,485
Int. Cl. B01d 3/38, 3/04
U.S. Cl. 203—89                      3 Claims

ABSTRACT OF THE DISCLOSURE

Improved process of recovering oil of hop from a solvent extract of hops by steam distillation in a novel manner, namely by passing the hop extract downwardly in a thin layer along an externally heated surface countercurrently to the upwardly flowing steam in an oxygen-free atmosphere. This process has the advantage of completely recovering the oil of hop from the steam distillate and simultaneously producing a residual hop extract containing other components of said extract in substantially unaltered form. If the temperature of the starting solvent extract of hops is between about 80° C. and about 135° C., partial isomerization of the humulones to the isohumulones which are important brewing additives, takes place.

---

The present invention relates to a process of producing essential oil of hop preparations, and more particularly to a continuous process of producing such oil of hop, and to products obtained thereby.

The recovery of volatile ethereal oils from fruits, seeds, flowers, and similar parts of plants does not pose any problems to the industry. In general the processes used in industry proceed by steam distillation, if necessary, under reduced pressure. However, when applying these known processes to the recovery and production of the essential oil of hop, considerable difficulties are encountered on large scale production. The cones of hop (the female blossoms of the twining Eurasian vine *Humulus lupulus*) rarely contain more than 1%, by weight, of essential oils. In general their essential oil content is only between about 0.1% and about 0.4%, by weight. However, not only the contents of essential oils but even more so the contents of humulones and so-called soft resins which amount to about 10% to 20%, by weight, in the hop are of the greatest importance with respect to the brewing value of hops. When treating hops according to the conventional processes for recovering essential oils as they are known in the art, for instance, when subjecting hops to the so-called "wet" steam distillation process in a distillation retort or to the so-called "dry" steam distillation process in a distillation column or the like, those hop components which are of value for brewing, i.e., the humulones and the like, will be destroyed so that the hops are useless for brewing. Thus in order to recover the essential oil, the other valuable hop constituents which are present therein in amounts 10 times to 20 times higher than its oil content are either completely destroyed or are altered in such a manner that they can no longer be used in the brewing process.

It is one object of the present invention to provide a simple and effective process for the recovery of the essential oils from hops which process is free of the above-mentioned disadvantages and which permits continuous operation.

Other objects of the present invention and advantageous features thereof will become apparent as the description proceeds.

In principle the process according to the present invention consists in first producing a solvent extract of hops which is freed of the organic solvent and contains the essential oils and then subjecting such an extract—and not the hop cones directly—to a thin layer countercurrent steam distillation in a vacuum or an inert gas atmosphere. (Suitable inert gases are nitrogen and carbon dioxide, as well as all noble gases.) These solvent extracts contain the entire essential oil of hop as well as all other components important for brewing. These extracts need not be produced specifically for the process of the present invention as they are readily available on a technical scale for the production of hop concentrates.

Extracts obtained from hops and prepared by extraction with ether or ethanol followed by an extraction with a mixture of ethanol and water or with water alone are known. It is also known to produce such extracts by extraction with chlorinated hydrocarbons, such as trichloroethylene, ethylene dichloride, and especially methylene dichloride which solvents are used either alone or in mixture with other solvents. The solvents are, of course, removed from the extract before subjecting it to the process of this invention.

As a special advantage of the process according to the present invention it has been found that the humulones contained in the solvent extracts of hops, are not only not destroyed when separating the oil of hop by heating but that, on the contrary, said humulones are partly isomerized, especially when operating at a temperature between about 80° C. and about 150° C. Operation at a temperature substantially higher than 150° C. is not advisable. At such a temperature the humulone is partly destroyed resulting in a considerable impairment of the brewing qualities of the treated "solvent extracts."

Such an isomerization is highly desirable because the humulones must be converted into isohumulones during the wort boiling of the brewing process. As a result thereof the solvent extracts treated according to the present invention do not need to be boiled as long as heretofore required because the isomerization has been effected before boiling. Hence, the process according to the present invention is of considerable advantage to the brewing industry.

Furthermore, this process permits addition of the separately prepared oil of hop after boiling as well as at any time during brewing. Thereby, the exquisite aromatic substances of hop or hop concentrates are retained which escape when conventionally effecting boiling with wort with its inherent steam distillation.

The following examples serve to illustrate the present invention without, however, limiting the same thereto.

The attached drawing shows an apparatus which has proved to be highly suitable for the purpose of this invention. The drawing illustrates diagrammatically a steam distillation apparatus into which the solvent extracts, preheated to a highly fluid consistency are introduced at B and sprayed uniformly onto the wall of tube R of a length of at least 1.5 m. by means of annular spraying device S. Tube R is externally heated by means of steam, hot water, electricity or similar means in such a manner that the solvent extracts retain their highly fluid consistency and flow downwardly along the wall of the tube. Steam of a maximum temperature of about 150° C. preferably between about 80° C. and 100° C. is sprayed into the tube through nozzle D. Said steam is moving upwardly, i.e., countercurrently to the flow of the solvent extracts, thereby causing removal of the oil of hop by steam distillation. The bitter substances freed of their essential oil content are collected in vessel G and are continuously discharged by means of pump $P_1$. The mixture of steam and oil of hop passes into and through condenser K where it is condensed and flows into settling vessel A. Water and the oil of hop separate in said vessel A into two layers which are continuously discharged by pumps $P_2$ and $P_3$. To increase the yield of oil of hop, the water discharged from settling vessel A can be extracted with an organic solvent in a liquid-liquid extracting device. Thereby any oil which is dissolved in the water layer can be recovered. For optimum yields of oil of hop, it is advisable that the residence time of the extract preferably not exceed two minutes in order to minimize decomposition and formation of byproducts. $J_1$ and $J_2$ are conduits provided with valves.

Recovery of the oil of hop in such an apparatus is carried out as follows:

EXAMPLE 1

150 kg. of the solvent extract of hop with a humulone content of 32.2%, by weight, are subjected to steam distillation in the above-described apparatus. The temperature of the solvent extract is 80° C. Throughput: About 70 kg. of solvent extract per hour. Vacuum: 30 mm. Hg 140 kg. of solvent extract with a humulone content of 29.7%, by weight, and an isohumulone content of 2.1%, by weight, are obtained; the distillate contains 10 kg. of oil of hop.

The solvent extract used as starting material is preheated to a highly fluid consistency. It contains between about 0.5%, and about 2.0%, by weight, preferably about 1%, by weight, of solvent. A higher solvent content of the starting solvent extract might prevent distillation of the oil of hop due to azeotropic removal of the solvent while, when reducing the solvent content of the solvent extract to below 0.5% this might cause distillation of part of the oil of hop with the solvent.

EXAMPLE 2

150 kg. of the solvent extract with a humulone content of 32.2%, by weight, are treated by following the procedure described in Example 1, whereby, however, the temperature of the solvent extract is 150° C. instead of 80° C., and nitrogen is used as inert gas. 140 kg. of solvent extract with a humulone content of 24.3%, by weight, and an isohumulone content of 7.4%, by weight, are obtained. 10 kg. of essential oil of hop are recovered from the distillate.

As stated above, a noteworthy advantage of the process according to the present invention is that it permits continuous recovery of the oil of hop without complicated reconstruction of and changes in the apparatus whereby it is possible to operate in an inert gas atmosphere at any desired pressure as well as in a vacuum. Steam distillation may be carried out at any temperature exceeding a temperature of 45° C. It may be pointed out that a lower temperature than 45° C. is not suitable because the solvent extracts are then too viscous to flow downwardly in a uniform thin layer along the tube wall. Thus, not only complete removal of the essential oils from the hop extract is achieved but also most careful and nondestructive treatment of the bitter substances is assured.

When operating in a vacuum, conduit $J_1$ is closed and vacuum is applied to conduit $J_2$; when distilling in an inert gas atmosphere, the gas is introduced through conduit $J_1$ and discharged through conduit $J_2$.

Of course, many changes, variations, and modifications in the starting material used and its composition, in the reaction conditions, temperature, pressure, duration, in the solvents used for preparing the starting extracts, in the distillation apparatus, in the method for working up and recovering the oil of hop and the bitter substances, and the like may occur to the skilled in the art without departing from the spirit and scope of the present invention, as defined in the appended claims.

We claim:

1. In a process of continuously recovering oil of hop, the steps which comprise subjecting a solvent extract of hops containing between about 0.5% and about 2.0% by weight of the solvent to steam distillation in an inert gas atmosphere while passing the hop extract in a thin layer downwardly along an externally heated surface countercurrently to the upwardly flowing steam, the temperature of the extract during steam distillation being between about 45° C. and about 150° C., and condensing the steam distillate to recover therefrom the oil of hop vapors.

2. In a process of continuously recovering oil of hop according to claim 1, the steps which comprise subjecting a substantially solvent-free extract of hops to steam distillation in a vacuum while passing the hop extract in a thin layer downwardly along an externally heated surface countercurrently to the upwardly flowing steam, the temperature of the extract during steam distillation being at least 45° C., and condensing the steam distillate to recover therefrom the oil of hop vapors.

3. The process according to claim 1, whereby the temperature of the extract during steam distillation is between about 80° C. and about 150° C.

References Cited

UNITED STATES PATENTS

| | | | |
|---|---|---|---|
| 2,249,524 | 7/1941 | Hickman et al. | 203—89 |
| 3,364,033 | 1/1968 | Spetsig | 99—50.5 |
| 1,800,632 | 4/1931 | Horst | 99—50.5 |
| 1,567,455 | 12/1925 | Newton | 159—13 X |
| 1,873,167 | 8/1932 | Weber | 99—50.5 |
| 2,367,695 | 1/1945 | Spiselman. | |
| 3,155,522 | 11/1964 | Hildebrand et al. | 99—50.5 |
| 3,222,181 | 12/1965 | Hoelle et al. | 99—50.5 |
| 3,298,835 | 1/1967 | Hildebrand et al. | 99—50.5 |

NORMAN YUDKOFF, *Primary Examiner.*

F. E. DRUMMOND, *Assistant Examiner.*

U.S. Cl. X.R.

203—96; 99—50.5; 202—236